(12) United States Patent
Yamaguchi et al.

(10) Patent No.: US 7,035,900 B2
(45) Date of Patent: Apr. 25, 2006

(54) BUSINESS MACHINE NETWORK TERMINAL AND BUSINESS MACHINE NETWORK INFORMATION MANAGEMENT SYSTEM

(75) Inventors: Takehito Yamaguchi, Hirakata (JP); Yuji Okada, Takarazuka (JP); Kenji Hisatomi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 710 days.

(21) Appl. No.: 09/955,289

(22) Filed: Sep. 19, 2001

(65) Prior Publication Data

US 2002/0087635 A1 Jul. 4, 2002

(30) Foreign Application Priority Data

Sep. 19, 2000 (JP) ............................. 2000-282973

(51) Int. Cl.
G06F 15/16 (2006.01)
G06F 15/173 (2006.01)
G06F 9/46 (2006.01)

(52) U.S. Cl. ...................... 709/205; 709/224; 709/225; 718/100; 718/102

(58) Field of Classification Search ................ 709/224, 709/225, 226, 205, 229; 718/100, 101, 102, 718/103, 104; 707/10
See application file for complete search history.

(56) References Cited

U.S. PATENT DOCUMENTS

| | | | | |
|---|---|---|---|---|
| 5,758,157 | A * | 5/1998 | Greenstein et al. | 718/104 |
| 5,909,493 | A * | 6/1999 | Motoyama | 713/154 |
| 6,006,251 | A * | 12/1999 | Toyouchi et al. | 709/203 |
| 6,189,032 | B1 * | 2/2001 | Susaki et al. | 709/225 |
| 6,253,251 | B1 * | 6/2001 | Benantar et al. | 719/315 |
| 6,398,432 | B1 * | 6/2002 | Day et al. | 400/88 |
| 6,459,773 | B1 * | 10/2002 | Posthuma | 379/1.04 |
| 6,473,812 | B1 * | 10/2002 | Motoyama | 710/15 |
| 6,493,760 | B1 * | 12/2002 | Pendlebury et al. | 709/229 |
| 6,657,992 | B1 * | 12/2003 | Christie, IV | 370/352 |
| 6,697,806 | B1 * | 2/2004 | Cook | 707/10 |
| 6,718,378 | B1 * | 4/2004 | Machida | 709/223 |
| 6,751,226 | B1 * | 6/2004 | Schow | 370/409 |
| 6,789,113 | B1 * | 9/2004 | Tanaka | 709/223 |
| 6,889,263 | B1 * | 5/2005 | Motoyama | 710/15 |

FOREIGN PATENT DOCUMENTS

| | | |
|---|---|---|
| JP | 03-025556 | 2/1991 |
| JP | 09-064870 | 3/1997 |
| JP | 10-051445 | 2/1998 |
| JP | 10-285324 | 10/1998 |

* cited by examiner

*Primary Examiner*—Ario Etienne
*Assistant Examiner*—El Hadji M. Sall
(74) *Attorney, Agent, or Firm*—McDermott Will & Emery LLP

(57) ABSTRACT

Business machine network terminal and a business machine network information management system are provided which collect information such as the use histories of business machines on services provided through cooperative processing, and which manage the accounting information on the machines for the services.

Business machine network terminal includes a service selecting means for selecting a service, a processing means for performing the processing necessary for the service, and a processing information transmitting means for transmitting the information that is generated on the basis of the processing with the processing means, and that is necessary for managing the terminals. The business machine network information management system includes the business machine network terminals and an information management server, which calculates predetermined management information on the basis of the information transmitted from the terminals.

7 Claims, 13 Drawing Sheets

Fig. 6

| USER ID | PASSWORD | USER'S SECTION | ISSUED USER HANDLE |
|---|---|---|---|
| AC001 | 1234 | ACCOUNT SECTION | NOT ISSUED |
| PE002 | 5678 | PERSONNEL SECTION | UH0001 |
| PL003 | 9012 | PLANNING SECTION | UH0002 |
| SA004 | 3456 | SALES SECTION | NOT ISSUED |
| TE005 | 7890 | TECHNICAL SECTION | UH0003 |

601 USER MANAGEMENT TABLE

Fig. 7

AVAILABLE SERVICE TABLE 701

| SERVICE NAME 702 | BUSINESS MACHINE NETWORK TERMINAL TYPE 1 703 | BUSINESS MACHINE NETWORK TERMINAL TYPE 2 704 | BUSINESS MACHINE NETWORK TERMINAL TYPE 3 705 | BUSINESS MACHINE NETWORK TERMINAL TYPE 4 706 |
|---|---|---|---|---|
| COPY (MONOCHROME) | MONOCHROME SCANNER | IMAGE PROCESSING SERVER | MONOCHROME PRINTER | |
| COPY (COLOR) | COLOR SCANNER | IMAGE PROCESSING SERVER | COLOR PRINTER | |
| IMAGE PROCESSING | SCANNER | IMAGE PROCESSING SERVER | ... | ... |
| FAX TRANSMISSION | MONOCHROME SCANNER | IMAGE PROCESSING SERVER | MODEM | |

Fig. 8

TERMINAL DEVICE MANAGEMENT TABLE 801

| DEVICE ID | FUNCTION ID | KEEPING SECTION | ACCOUNTING RULE ID |
|---|---|---|---|
| DEV001 | FN001 | ACCOUNT SECTION | AC001 |
| DEV002 | FN002 | PERSONNEL SECTION | AC002 |
| DEV003 | FN003 | PLANNING SECTION | AC003 |
| DEV004 | FN004 | SALES SECTION | AC001 |
| DEV005 | FN005 | TECHNICAL SECTION | AC002 |

Fig. 9

FUNCTION TABLE 901

| FUNCTION ID 902 | FUNCTION TYPE 903 | PERFORMANCE INDEX ID 904 | OPTIONAL FUNCTION INDEX ID 905 |
|---|---|---|---|
| FN001 | SCAN | PER001 | OP001 |
| FN002 | PRINT | PER002 | OP002 |
| FN003 | PRINT | PER003 | OP003 |
| FN004 | IMAGE PROCESSING | PER004 | OP004 |
| FN005 | FAX TRANSMISSION | PER005 | OP005 |

Fig. 10

ACCOUNTING RULE TABLE 1001

| ACCOUNTING RULE ID | CHARGE PER SERVICE (YEN/SERVICE) | | |
|---|---|---|---|
| | KEEPING SECTION MEMBER | ANOTHER MEMBER | GUEST |
| AC001 | 1 | 5 | 5 |
| AC002 | 5 | 10 | 20 |
| AC003 | 20 | 20 | 30 |

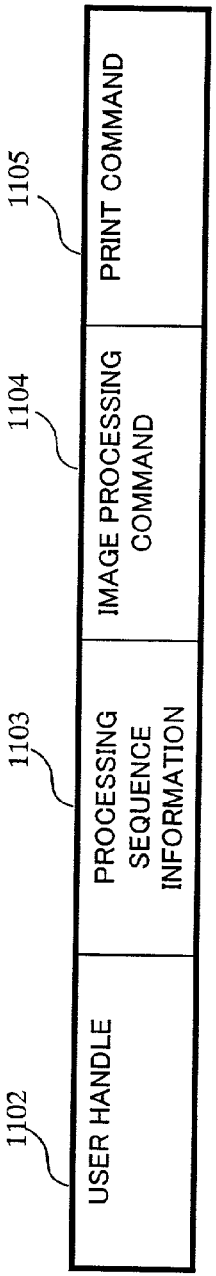
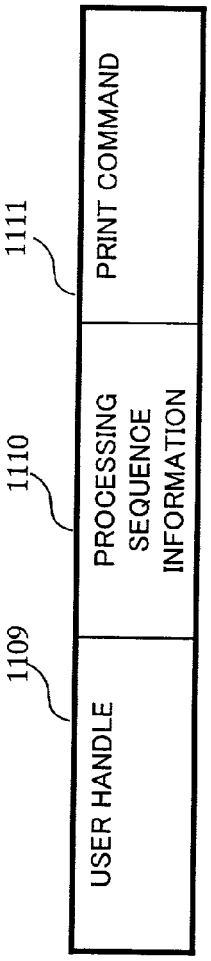
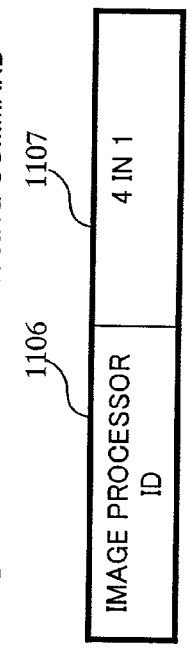
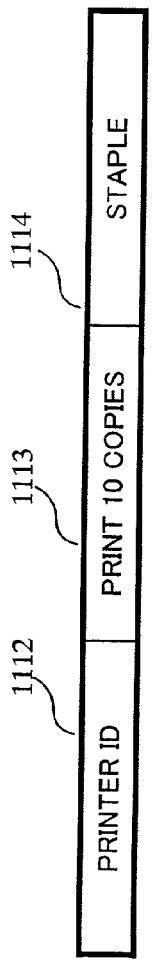
Fig. 11A MULTIPLEX PROCESSING REQUEST PACKET 1101
Fig. 11B MULTIPLEX PROCESSING REQUEST PACKET 1108
Fig. 11C IMAGE PROCESSING COMMAND
Fig. 11D PRINT COMMAND Fig. 12 A  SCANNER USE INFORMATION 1201
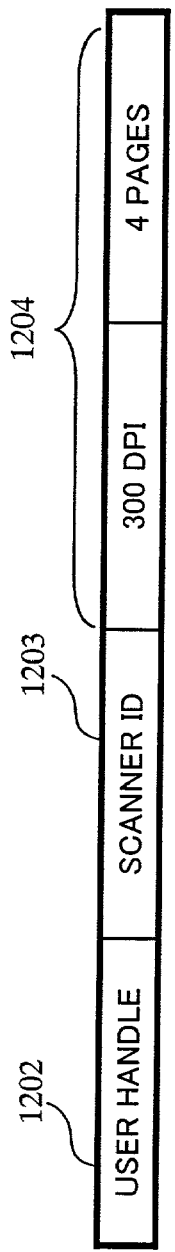
Fig. 12 B  IMAGE PROCESSOR USE INFORMATION 1205
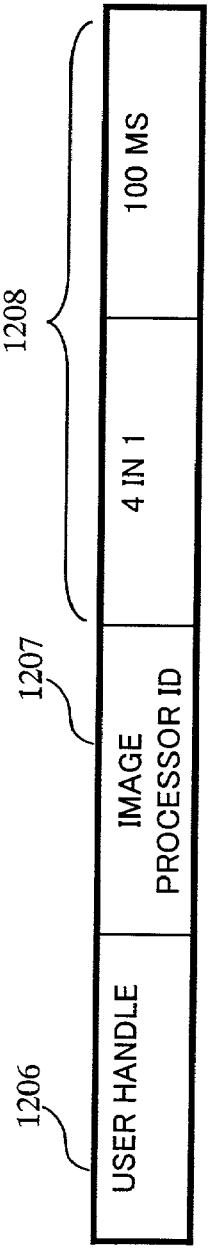
Fig. 12 C  PRINTER USE INFORMATION 1209
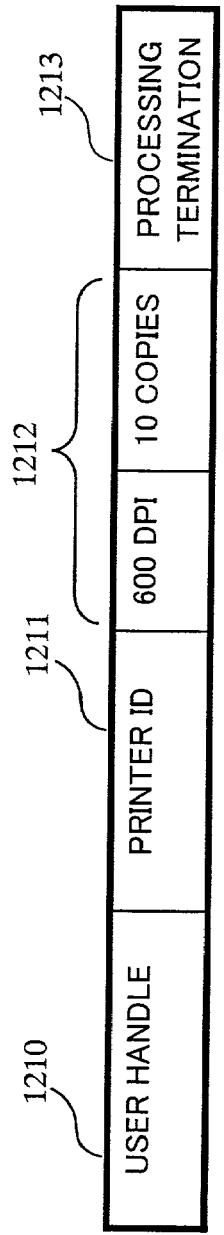

BUSINESS MACHINE NETWORK TERMINAL AND BUSINESS MACHINE NETWORK INFORMATION MANAGEMENT SYSTEM

FIELD OF THE INVENTION

The present invention relates to business machine network terminals and a business machine network information management system. In particular, the invention relates to business machine network terminals and a business machine network information management system which manage information on business machines in accordance with the services provided by the cooperative processing of the machines.

BACKGROUND OF THE INVENTION

Digital integrated equipment incorporated various functions has appeared in recent year. This integrated equipment may include business machines such as a facsimile, a printer and a scanner incorporated therein. Such integrated equipment is applied to various places, because it can carry out various desired operations thou it is a single unit. There is digital integrated equipment having a function with which it is possible to recognize (know) the history in use of this equipment by specifying (authenticating) the users by their ID cards or the like.

It is difficult to expand or add new functions of this equipment, a scanner function for example, corresponding to the frequencies in use, because different functions are incorporated in the equipment as one unit.

On the other hand, as computers (personal computers) have come into wide use, it has become possible to serve functions similar to those of the digital integrated equipment by connecting printers, scanners, facsimile modems and/or other peripheral devices to the computers.

It has also become possible to inexpensively install to networks for interconnecting computers etc. This has made it possible to share the peripheral devices interconnected via each computer with other computers.

Thus, the techniques for sharing the peripheral devices interconnected via a network have rapidly been spreading. It is easily expected that such a peripheral device will be a business machine network terminal having a basic function and a network function, and that two or more users will share the terminal as a standalone device without a computer or the like intervening between them, as is already the case with some printers etc. If this terminal is a scanner, for example, its basic function is a scan function.

Against this background, it will be possible to materialize the functions of digital integrated equipment by connecting business machines independently to a network and making them cooperate with each other. This makes it possible to provide a distributed processing system including business machine network terminals. It is easy to expand the functions of this system and incorporate new functions therein.

FIG. 5 shows such a business machine network system 501, which includes business machine network terminals 502–505 connected through a network 507. The copy function of the system 501 involves first reading an image on the scanner 502. The scanner 502 transmits the read image as electronic data to the image processing server 503. The server 503 performs a series of operations (services), which include converting the received electronic data into an appropriate format, and outputting the converted data to the printer 504. The facsimile function of the system 501 involves reading an image on the scanner 502 likewise, and inputting the phone number of the object destination. The scanner 502 transmits the read image as electronic data to the server 503. The server 503 converts the received electronic data into a facsimile transmission format, and transmits the converted data to the facsimile modem 505. The modem 505 then transmits the received data to the object terminal through a telephone line 506. Thus, the business machine network terminals, each of which has only a basic function and a network function, cooperate for each service.

This business machine network system may not be object for general and personal use, but may be effective if it is shared by a large number of users in a relatively large-sized organization.

For example, there may be groups (or individuals) carrying out a series of projects in a business establishment, where the groups may use business machines in common. This situation would represent a common practice in an ordinary company. Since the groups can share the common business machines, one business machine is sufficient for each of serial operations. It is possible to freely expand the functions of the business machines in accordance with the purposes of the machines and/or the frequencies of the use of the machines in order to eliminate a bottleneck of the machines. Specifically, if the processing speed of the scanner is low, a new scanner can be added. Likewise, if the print speed of the printer is low, a new printer can be added. Otherwise, it is possible to introduce a color printer or another business machine having a new function.

In a hotel, for example, a scanner is installed in each room, and a such as a facsimile modem is installed in the front of the hotel. The data of original document read by the scanner can be transmitted via the transmitter to a facsimile or a printer. In other words, it is possible to provide a facsimile service or a copy service by merely equipping each room with an inexpensive unit having only scan and network functions. It is also possible to equip each room with a desired business machine in response to the guests' needs.

However, since the business machine network system has no means for comprehensively recognizing the use histories of the business machines used by the groups (or individuals), it is expected that it will not be possible to acquire information for specifying the bottleneck. One reason for this is that, because the conventional digital integrated equipment is integrally constructed and consequently lacks extensive flexibility, there is no need to specify the bottleneck in this equipment. Another reason is that, because the business machines of the business machine network system are connected, as independent or standalone units for serving only basic functions, to a network, the business machine network terminals need to cooperate with each other with a view to the above-mentioned function expansion, so that the control of the system may be more complex than that of the conventional digital integrated equipment, which is integrally constructed.

In order to use the full advantage of this business machine network system that the functions can be freely expanded, it is necessary to acquire information or the like for specifying the bottleneck. Only after specifying a bottleneck, it is possible to efficiently expand the associated function.

In order to calculate the expense of each project, it is necessary to record the using frequencies or the using time period of the group (or individual) for each project has used each business machine, and calculate the running costs etc. (e.g. expenses for paper and toners in the case of a printer) for each project. This should be a natural demand in the recent business style, which has been increasingly divided.

The business machines are independently connected to the network. Unlike the integrally constructed equipment, various combinations of business machine network terminals are used for different services. This makes it impossible to find the using time period for the business machine. As a result, it is impossible to calculate the expense of each project.

If a facsimile service or a copy service is provided for the rooms of a hotel, it is necessary to account (or charge) for the service in addition to the lodging. The accounting is processed merely manually at the hotel front under the existing circumstances.

SUMMARY OF THE INVENTION

It is therefore the object of the present invention to provide business machine network terminals and a business machine network information management system which collect information, such as the use histories of business machines, on services provided through cooperative processing, and which manage the accounting information on the machines for the services.

In accordance with an aspect of the present invention, business machine network terminal providing services by transmitting and receiving data to/from other terminals including a different function through a network and performing cooperative processing with the other terminals. The business machine network terminal has a function different from the functions of the others, and comprises a service selecting means for selecting one of the services, a processing means for performing necessary processing based on the selected service, and a processing information transmitting means for transmitting the service information that is generated on the basis of the processing with the processing means, and that is necessary for managing the terminals.

The service selecting means may decide available services on the basis of a list of the terminals necessary for the services and information on the terminals connected to the network.

The business machine network terminal may further comprises an input means with which a user of the terminal can make an entry. The terminal may also comprise a means for batch management of information, which comprises service information, on the processing Because different machines are incorporated in the digital integrated equipment as one unit, performed by the terminals.

In accordance with another aspect of the present invention, a business machine network information management system is provided, which comprises the business machine network terminals and an information management server for calculating management information on the basis of the information transmitted from the terminals.

BRIEF DESCRIPTION OF THE DRAWINGS

FIG. 6 is a user management table.
FIG. 7 is an available service table.
FIG. 8 is a device information management table.
FIG. 9 is a function table.
FIG. 10 is an accounting rule table.
FIG. 11 shows packet structures.
FIG. 12 shows use information structures.

PREFERRED EMBODIMENTS OF THE INVENTION

Preferred embodiments of the present invention will be described below with reference to the accompanying drawings. The invention is not limited to these embodiments. Herein, the business machine network terminals may include a scanner, a printer, a facsimile modem (communication device), a facsimile, digital integrated equipment, a personal computer, an image processing server and a memory. Each of the terminals has a basic function and a network function, and can independently serve the basic function.

EMBODIMENT 1

Figure 1:
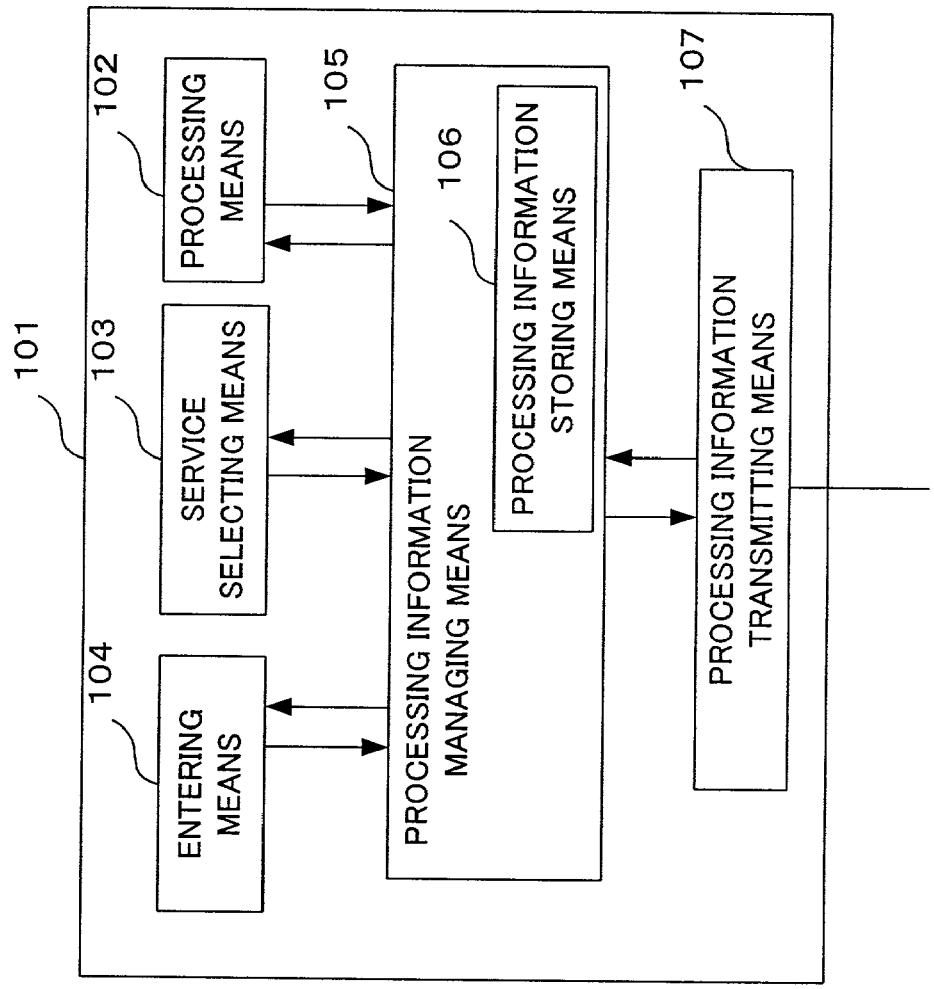
FIG. 1 is a block diagram of a business machine network terminal related to Embodiment 1 of the present invention.
Figure 2:
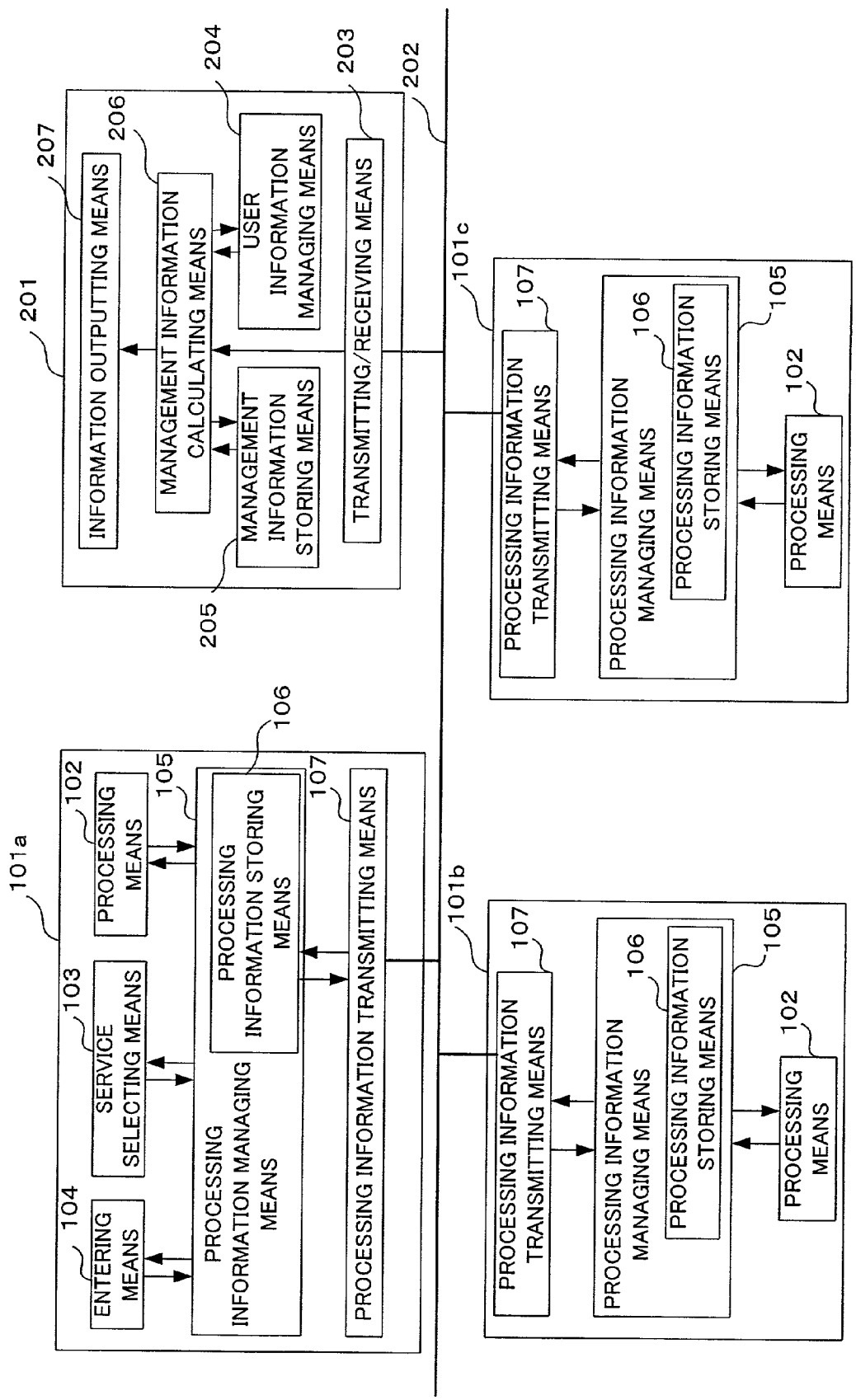
FIG. 2 is a schematic diagram of a business machine network system.

With reference to FIGS. 1 and 2, the structures of business machine network terminals related to Embodiment 1 of the present invention will be described. FIG. 1 is a block diagram of one of the terminals. FIG. 2 is a schematic diagram of a business machine network system.

In FIG. 1, the business machine network terminal 101 includes a processing means 102, a service selecting means 103, an input means 104, a processing information managing means 105 and a processing information transmitting means 107. The managing means 105 includes a processing information storing means 106.

The processing means 102 of each business machine serves the basic function of the machine. If the machine is a printer, the basic function is a print function. If the machine is a scanner, the basic function is a scan function. If the machine is an image processing server, the basic function may be an image processing function, which is performed by a CPU (central processing unit).

The service selecting means 103 serves a function for the users of the business machine network terminal 101 to select one of the services provided by the business machine network system. The service types depend on the business machine network system to which the terminal 101 is connected. The services may include a monochrome copy service, a color copy service and a facsimile service. If the selected service can be provided by two or more business machine network terminals, the service selecting means 103 serves a function for displaying their throughputs, conditions, etc. in order for the users to select one of the terminals. This selecting means 103 is not an essential component, and is not required for an image processing server 503 and other business machines not operated directly by the users. The input means 104 enables the users of the network terminal 101 to make entries. The users may be authenticated by inputting their user names and passwords or inserting their ID cards in the input means 104. The input means 104, like the service selecting means 103, is not essential for a business machine network terminal not operated directly by the users. The other components will be described later on as the need arises.

In FIG. 2, business machine network terminals 101*a*, 101*b* and 101*c* and an information management server 201 are connected via a network 202, which may concretely be a LAN (local area network) or a WAN (wide area network). Each of the terminals 101a–101c is the business machine network terminal 101 shown in FIG. 1. But these terminals do not include an input means 104 and a service selecting means 103 because the terminals 101b and 101c are not operated directly by the users. The terminals 101b and 101c may each be a printer, a facsimile modem or an image processing server.

The information management server 201 includes a transceiver (transmitting/receiving means) 203, a user information managing means 204, a management information storing means 205, a management information calculating means 206 and an information outputting means 207. On the basis of the user information inputted from the input means 104 of the terminal 101a, the user information managing means 204 judges whether the user is allowed to receive the services provided by the business machine network system. The management information storing means 205 stores therein the predetermined information (mentioned later on) transmitted from the terminals 101a–101c. Concretely, this storing means 205 is a hard disk or another memory. On the basis of the information stored in the storing means 205, the management information calculating means 206 calculates various pieces of information (mentioned later on). The information outputting means 207 prints and displays the calculated information.

In order to display the throughputs, conditions, etc. of the business machine network terminals, it is needed a protocol for interchanging the information of the throughputs, conditions, etc via the network.

A typical example of such a protocol is JINI (TM), which is a protocol proposed by Sun Microsystems, Inc. The mechanism of information interchange according to JINI is described in detail on a home page provided by Sun Microsystems, Inc., and will be described briefly below.

When JINI-enabled terminals start, they search for a look-up server on the network by means of a broadcast. If they find a look-up server, they transmit information on their functions and performance to this server. The look-up server registers and stores the received information in its internal database. Thus, the information on the functions and performance of the terminals is collected in the look-up server.

Next, each terminal that needs to acquire the information on the functions and performance of the available terminals searches for the look-up server on the network by broadcast. If the terminal finds the look-up server, the terminal transmits inquiry information to the server. The inquiry information specifies the function information and performance information that are needed by the terminal it self. The look-up server compares the received inquiry information and the information registered in the internal database, and transmits the function information and performance information on the extracted terminals by the comparing to the terminal. The terminal may display the received information on a display. Thus, the terminal that needs the information on the functions and performance of the available terminals can acquire this information via the look-up server.

It is now assumed that the business machine network terminals are connected to the network 202 and have each acquired the information on the others by means of JINI or the like. The acquired information may be stored at the field of device IDs 802, the keeping sections 804 and the accounting rule IDs 805 of the device information management table 801 shown in FIG. 8, and in the function table 901 shown in FIG. 9. The function IDs 902 of the function table 901 are a key table for reference to this table. A function type 903, a performance index ID 904, an optional function index ID 905, etc. are allotted to each function ID 902. The function type 903 represents the function of the device identified by the associated function ID 902. The performance index ID 904 represents the performance of the device. The optional function index ID 905 represents the optional function that can be served by the device. Processes will be explained in detail in order.

Figure 3:
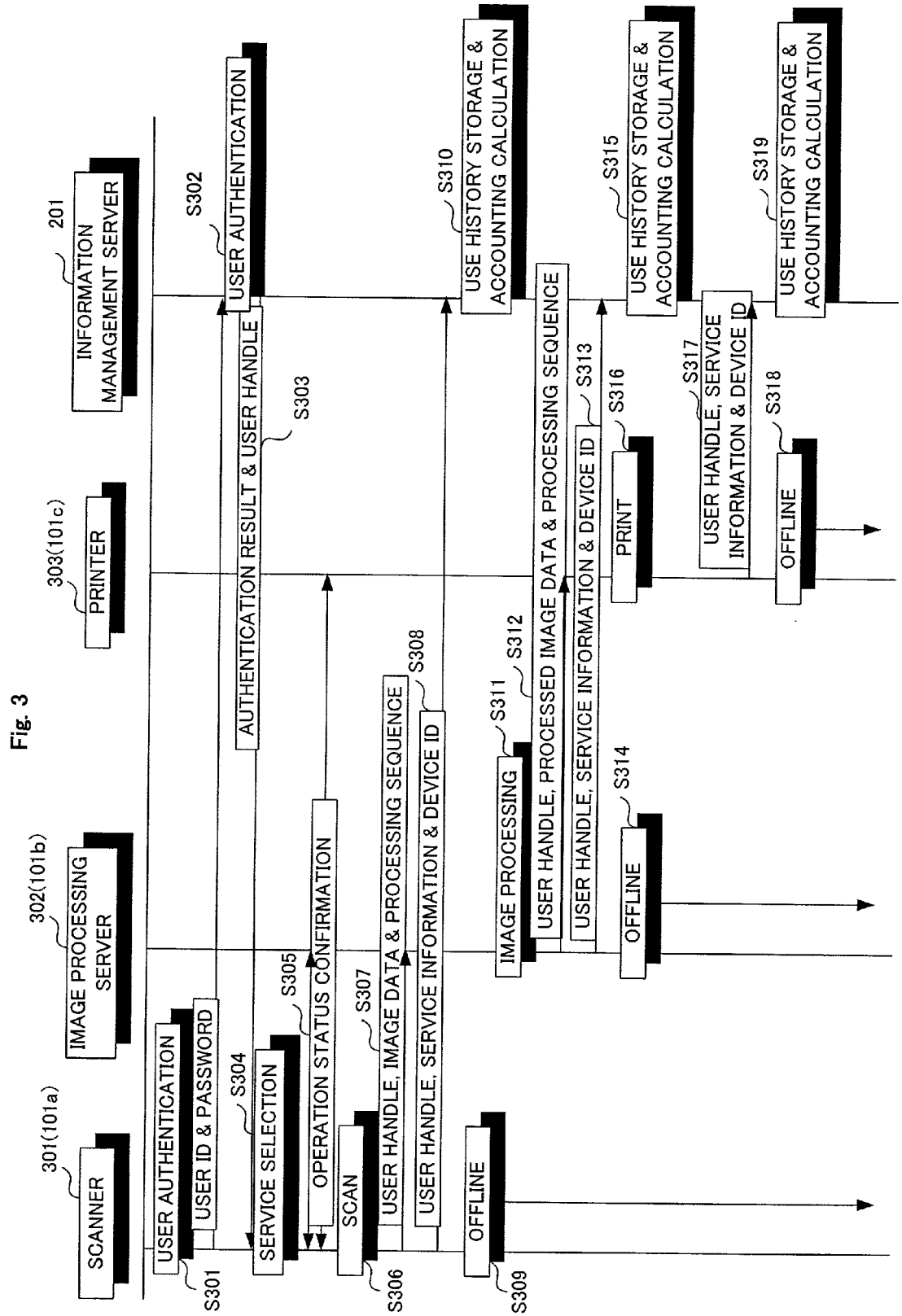
FIG. 3 is a processing flowchart for a business machine network system according to Embodiment 1.

With reference to FIGS. 2, 3 and 6–12, the processing for managing the information on the services provided by the business machine network system according to Embodiment 1 will be described below in detail. FIG. 3 is a processing flowchart for this system.

First, in this Embodiment 1, the copy service provided by the business machine network system will be described. With reference to FIG. 3, a scanner 301, an image processing server 302 and a printer 303 corresponding to the business machine network terminals 101a, 101b and 101c, respectively, shown in FIG. 2. In FIG. 3, "S" preceding a numeral represents a step.

A user wanting to use a copy service may first insert his or her ID card into the scanner 301, and then inputs his or her password (S301 in FIG. 3). The information of the ID card and the password are then read out from the input means 104 of the scanner 301 and transmitted via the processing information managing means 105 and processing information transmitting means 107 of the scanner 301 to the information management server 201. When the user information managing means 204 of this 20 server 201 receives the card information and the password via the transceiver 203 of the server 201, this server carries out user authentication (S302 in FIG. 3) with reference to the user management table shown in FIG. 6. The user management table 601 contains user IDs 602, passwords 603, users' sections 604 and issued user handle field 605. The user IDs 602 is corresponding to the information written in the ID cards. The password 603, section 604 and handle 605 will be explained later on.

If the information of the ID card and the password that are transmitted from the scanner 301 coincide with one of the user IDs 602 and the associated password 603, respectively, that have been registered in the user management table 601, this fact and a user handle are transmitted via the processing information managing means 105 of the scanner 301 to the input means 104 of this scanner (S303 in FIG. 3). If they do not coincide, this fact is transmitted likewise to the input means 104. A user handle is an identification number issued to each user as required. If the user is authenticated as a right user, the user information managing means 204 issues the user handle. The issued user handle is stored at the issued user handles 605 of the table 601. A user handle might be allotted in advance to each user, or each user ID might be substituted for a user handle.

Judging from the result of the user authentication, the input means 104 of the scanner 301 decides whether the copy service can be provided to the user. The user handle may have a time limit, which may be stored in advance in the user information managing means 204. In this case, this managing means 204 carries out the user authentication (S302) with additional reference to the time limit of the user handle. It is thus possible to prevent wrong use of the services for a long time.

If the user is authenticated, the processing information managing means 105 of the scanner 301 stores in the processing information storing means 106 of this scanner the user handle transmitted from the user information managing means 204. Subsequently, the processing information managing means 105 instructs the service selecting means 103 of the scanner 301 to display the services that can be provided by the business machine network system. On the basis of the information acquired already about the functions, performance, etc. of the other business machine network terminals by means of JINI or the like, the selecting means 103 displays a list of the available (selectable) services. As shown in FIG. 7, the selecting means 103 has an available service table 701, which contains service names 702 and business machine network terminal types 703–706. Each of the terminal types 703–706 represents the machine required for the service represented by the associated service name 702. The terminal types 1–4 (703–706) in the service table 701 indicate the processing sequence for each service.

The information acquired about the business machine network terminals from the look-up server or the like under JINI or the like may show that a monochrome scanner, an image processing server and a monochrome printer are connected. In this case, the service selecting means 103 judges that a copy (monochrome) service is available. Similar judgments can be made for the other services.

Now on the assumption that the authenticated user may select the copy service out of the services displayed by the service selecting means 103 (S304 in FIG. 3). And on the assumption that too, a plurality of printers, which include a color printers or a monochrome printers, may be connected in the business machine network system. If the copy service is selected, the selecting means 103 displays the color or monochrome printers, their unit printing costs (prices), their locations, and other information. This enables the user to select the desired printer. Likewise, the user selects the desired image processing server. Alternatively, a suitable printer and a suitable image processing server may selected automatically. In particular, as the business machine network terminals on a network increase in number, their combinations increase exponentially in number. It is therefore foreseeable that a user cannot easily determine a combination of the terminals and the sequence of cooperative processing. In addition, because the configuration of the terminals connected via the network may vary, the abovementioned determination needs to be made quickly. It is therefore preferable that the service selecting means 103 should select business machine network terminals on the basis of the information about the functions, performance, etc. of the terminals, and about the places where they are installed.

On completion of the selection of the printer and the image processing server, the selection information is sent to the processing information managing means 105. On the basis of the sent information, this managing means 105 confirms the operation statuses of the selected image processing server 302 and printer 303 (S305 in FIG. 3). The operation statuses may be whether the server and/or the printer is busy with another service, whether the printer is out of paper, and/or whether the selected service cannot be provided for other reason. The operation statuses may be confirmed before the service selection is displayed.

If it is confirmed that the operation statuses have no problem for carrying out the selected service, the completion of the service selection decides the processing sequence for providing a series of services in the business machine network system on the basis of the service table 701. The processing information managing means 105 stores the decided processing sequence as processing sequence information in the processing information storing means 106.

Subsequently, the user scans a paper with the processing means 102 of the scanner 301 (S306 in FIG. 3). On completion of the scanning, the processing information managing means 105 transmits to the image processing server 302, on the basis of the processing sequence information stored in the processing information storing means 106, the user handle, the processing sequence information, commands for the other business machine network terminals, and the image data generated by the scanning (S307 in FIG. 3). The handle, commands and data have been stored in the storing means 106. FIG. 11A shows a multiplex processing request packet 1101 that the processing information managing means 105 transmits to the image processing server 302. This packet 1101 consists of a user handle 1102, processing sequence information 1103, an image processing command 1104 and a print command 1105. The user handle 1102 and the processing sequence information have been stored in the processing information storing means 106.

The processing sequence information 1103 includes, in order of processing, the IDs of the business machine network terminals for providing a service selected by the user. In this instance, the sequence information 1103 includes the IDs of the image processing server 302 and printer 303 in that order.

As shown in FIG. 1C, the image processing command 1104 consists of an image processor ID 1106 and a command 1107. The command 1107 is the specific command based on the processing information selected (or inputted) with the service selecting means 103 by the user. In this instance, the command 1107 represents "4 in 1" processing, which is a process of layout conversion for arranging four pages of data in one page.

When the data generated by the scanning is transmitted from the scanner 301 to the image processing server 302, this data may be added to a predetermined part of the multiplex processing request packet 1101 or transmitted separately.

Thus, the data read in by the scanner 301 is transmitted together with the user handle, the processing sequence information, etc. to the image processing server 302.

Further, the processing information managing means 105 of the scanner 301 transmits the user handle, the device ID (the unique ID assigned to the scanner 301), and service information to the information management server 201 (S308 in FIG. 3). The service information is the information generated on the basis of the processing with the scan function, which is the processing means of the scanner 301. This information includes the time at which and the period for which the scanner 301 has been used, the scan frequency, the scan resolution, the total size of the generated image data, the service type, and the amount of money that the processing has cost. FIG. 12A shows the structure of a packet including scanner use information that is transmitted from the scanner 301 to the information management server 201. The scanner use information 1201 consists of a user handle 1202, a device ID 1203 and service information 1204. Specifically, the device ID 1203 is the ID of the scanner 301. In this instance, the service information 1204 consists of the scan resolution and the scan frequency (the number of pages).

The transmission of the scanner use information to the information management server 201 completes the processing with the scanner 301 for providing the copy service. Thereafter, the scanner 301 can be offline for the saving of electricity (S309 in FIG. 3).

The information management server 201 receives the user handle, the device ID and the service information, and its management information calculating means 206 stores the received handle, ID and information in the management information storing means 205. If necessary, the calculating means 206 makes an accounting calculation and outputs the result of the calculation to the information outputting means 207. This processing will be explained later on in detail (S310 in FIG. 3).

Receiving the user handle, the processing sequence information, the commands for the business machine network terminals, and the image data generated by the scanning, the processing information managing means 105 of the image processing server 302 stores the received handle and sequence information in its processing information storing means 106. In the meantime, the processing means 102 of this server 302 performs the processing based on the command for this terminal (S311 in FIG. 3). In this instance, the processing is the "4 in 1" processing (data conversion) represented by the command 1107. This processing means 102 is the data converting means incorporated as a program in the CPU of the server 302.

The processing information managing means 105 of the image processing server 302 transmits to the printer 303 the user handle and the processing sequence information that have been stored in the processing information storing means 106, and the processed image data (S312 in FIG. 3).

FIG. 11B shows a multiplex processing request packet 1108 that the image processing server 302 transmits to the printer 303. This packet 1108 consists of a user handle 1109, processing sequence information 1110 and a print command 1111. The packet 1108 is the remainder of the multiplex processing request packet 1101 from which the command(s) for the image processing server 302 (101b) and the image processor ID have been removed in this server.

The processing sequence information 1110 includes the ID of the printer 303. As shown in FIG. 11D, the print command 1111 consists of a printer ID 1112 and commands 1113 and 1114. The commands 1113 and 1114 are the specific commands based on the processing information selected (inputed) with the service selecting means 103 by the user. In this instance, the commands 1113 and 1114 represent "print 10 copies" and "staple", respectively.

Thus, the image data converted in the image processing server 302 is transmitted together with the user handle, the processing sequence information and the print command to the printer 303.

Further, the processing information managing means 105 of the image processing server 302 transmits the user handle, the device ID (the image processor ID in this instance), and service information to the information management server 201 (S313 in FIG. 3). The service information is the information generated on the basis of the processing with the CPU as the processing means of the image processing server 302. This information includes the time at which and the period for which the image processing server 302 has been used, the total size of the processed image data, the service type, and the amount of money that the processing has cost.

FIG. 12B shows the structure of a packet including image processor use information that is transmitted from the image processing server 302 to the information management server 201. The image processor use information 1205 consists of a user handle 1206, a device ID 1207 and service information 1208. Specifically, the device ID 1207 is the ID of the image processing server 302. In this instance, the service information 1208 represents the "4 in 1" processing and the period (100 ms in this instance) for which the CPU of the processing server 302 has been used for the processing.

The transmission of the image processor use information to the information management server 201 completes the processing with the image processing server 302 for providing the copy service. Thereafter, the image processing server 302 can be offline (S314 in FIG. 3).

The information management server 201 receives the user handle, the device ID and the service information, and its management information calculating means 206 performs processing similar to that performed when similar information is received from the scanner 301 (S315 in FIG. 3).

Receiving the user handle, the processing sequence information and the processed (converted) image data, the processing information managing means 105 of the printer 303 stores the received handle and sequence information in its processing information storing means 106. In the meantime, the processing means 102 of the printer 303 prints the processed image data (S316 in FIG. 3). Next, the processing information managing means 105 transmits the user handle, the device ID (the unique ID assigned to the printer 303), and service information to the information management server 201 (S317 in FIG. 3). The service information is the information generated on the basis of the processing with the print function, which is the processing means of the printer 303. This information includes the time at which and the period for which the printer 303 has been used, the used print sheet size, the number of printed copies, the amount of consumed toner, the service type, and the amount of money that the processing has cost.

FIG. 12C shows the structure of a packet including printer use information that is transmitted from the printer 303 to the information management server 201. The printer use information 1209 consists of a user handle 1210, a device ID 1211, service information 1212 and processing termination information 1213. Specifically, the device ID 1211 is the ID of the printer 303. In this instance, the service information 1212 consists of "600 dpi" and "10 copies" (the number of printed copies).

The transmission of the printer use information to the information management server 201 completes the processing with the printer 303 for providing the copy service. Thereafter, the printer 303 can be offline (S318 in FIG. 3). Receiving the processing termination information 1213, the user information managing means 204 of the management server 201 initializes the issued user handle of the corresponded user in the user management table 601 in such a manner that the handle is not yet issued or is blank.

The foregoing processing completes the copy service provided by the business machine network system.

Receiving the user handle, the device ID and the service information, the management information calculating means 206 of the information management server 201 performs processing similar to that performed when similar information is received from the scanner 301 or the image processing server 302 (S319 in FIG. 3). Specifically, on the basis of the service information about the business machine network terminals that is stored in the management information storing means 205 and the user information (for example, the group to which the user belongs and the project in which this group is involved) stored in the user information managing means 204, the management information calculating means 206 calculates various pieces of management information. This information may include the use histories of the terminals, the sum of money that the service used by the user has cost (accounting information), and the costs or expenses per project.

A method for the calculation of management information in the information management server 201 will be explained. As explained below, the sum of money that the use of the scanner 301 has cost (accounting information) is calculated at S310. The calculation at S310 is similar to that at S315 and S319. On receipt of the scanner use information 1201, the management information calculating means 206 refers to the user handle 1202 of this information. The calculating means 206 then selects from the user management table 601 the user ID 602 and the user's section 604 that are associated with the issued user handle 605 identical with the handle 1202.

The management information calculating means 206 also refers to the scanner ID 1203. The calculating means 206 then selects from the device information management table 801, which is shown in FIG. 8, the function ID 803, the keeping section 804 and the accounting rule ID 805 that are associated with the device ID 802 identical with the scanner ID 1203. The function IDs 803 of the table 801 are used for reference to the function table 901 shown in FIG. 9. The keeping sections 804 of the management table 801 may represent the names of the sections keeping the respective devices. The accounting rule IDs 805 of this table 801 are used for reference to the accounting rule table 1001 shown in FIG. 10, which will be explained later on.

The management information calculating means 206 selects from the accounting rule table 1001 the accounting rule ID 1002 identical to the accounting rule ID 805 selected from the device information management table 801. Also, the calculating means 206 judges whether the selected user's section 604 is identical with the selected keeping section 804. If these sections 604 and 804 are identical, the accounting means 206 applies to the selected user ID 602 the amount of money at the keeping section members 1003 that is associated with the selected accounting rule ID 1002. The application should be the addition of the amount to the field in an accounting database (not shown) that corresponds to (or is associated with) the user ID 106.

If the keeping section 804 and the user's section 604 differ, the accounting means 206 applies to the user ID 602 the amount of money at the other members 1004 that is associated with the accounting rule ID 1002 selected from the accounting rule table 1001. If the selected user ID 602 is the ID of a guest who is not a member of the company keeping the devices, the accounting means 206 applies to the user ID 602 the amount of money at the guests 1005 that is associated with the selected accounting rule ID 1002. It is thus possible to account (or charge) at the scanner 301 (as one of the business machine network terminals) for the use of this scanner. It is also possible to lower the charges on the users belonging to the section keeping a device for their use of this device and raise the charges on the users belonging to the other sections for their use of the device. This makes it possible to do flexible accounting.

The accounting is carried out for each service, but could of course be carried out on the basis of service information such as the number of printed copies, the period for which the CPU has been used, and/or the resolution. The service information may include the time at which and the period for which each business machine network terminal has been used. The totalization of the operation time for each terminal makes it easy to find the period of each terminal has been used.

Thus, the information management server 201 centrally manages the information on the processing performed by the business machine network terminals 301–303. This makes it possible to recognize (know) the use histories of the terminals, and specifically the rate at which each terminal has been used. It is consequently possible to acquire definite information such as information that the business machine network system has been short of printers or that the scanner has frequently been busy. Such information is very effective in exploiting the advantage of the system that the functions of the system can be freely expanded. Unlike the integrally constructed equipment, various combinations of business machine network terminals are used for different services. This would otherwise make it very difficult to grasp the costs for a series of services. However, the information management mentioned above makes it possible to accurately calculate the cost for each service. This is effective also as an accounting method in a case where a facsimile service is available in each room of a hotel, as mentioned in the Background of the Invention, or another case where business machine network terminals are used for commercial purposes.

Embodiment 1 could provide a facsimile service easily by replacing the printer 303 with a facsimile modem and adding a telephone charge (calling time information or the like) to the service information that the modem transmits to the information management server 201.

Embodiment 1 authenticates the users, but might not need to do so if it were not necessary to calculate the expenses for each project, and if it were necessary to know only the use histories of the business machine network terminals.

The service information might be only the amount of money that the processing with each business machine network terminal has cost according to need. Each terminal might have a function for calculating this amount of money. This makes it possible to acquire only the accounting information on a provided service. It is consequently possible to reduce the processing with the information management server.

For the provision of services in a hotel, the device IDs might be set in place of the user IDs, and the users might input their room numbers in place of their passwords. Alternatively, the room numbers, too, might be set in advance in place of the passwords.

EMBODIMENT 2

Figure 4:
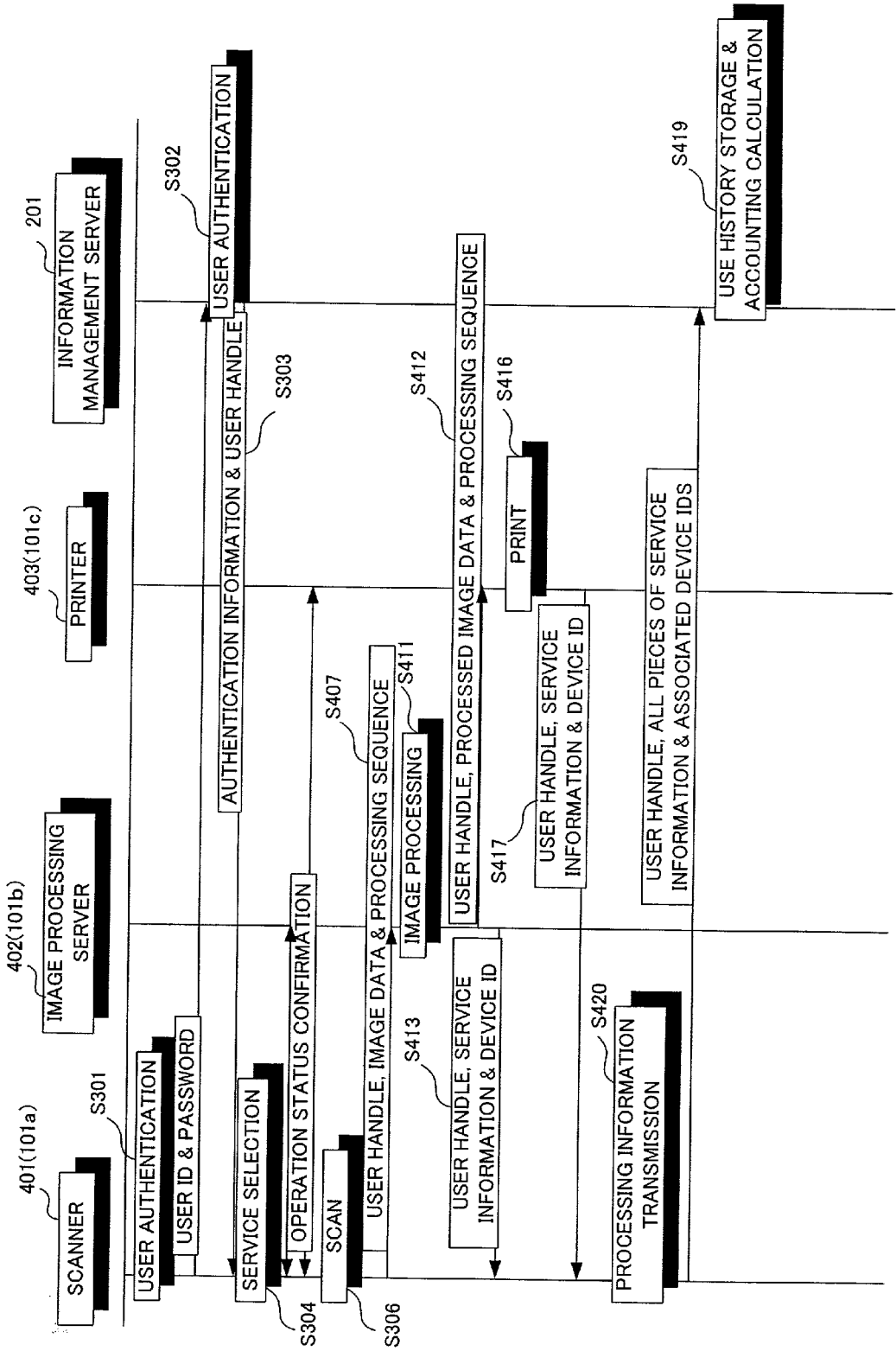
FIG. 4 is a processing flowchart for a business machine network system according to Embodiment 2 of the invention.
Figure 5:
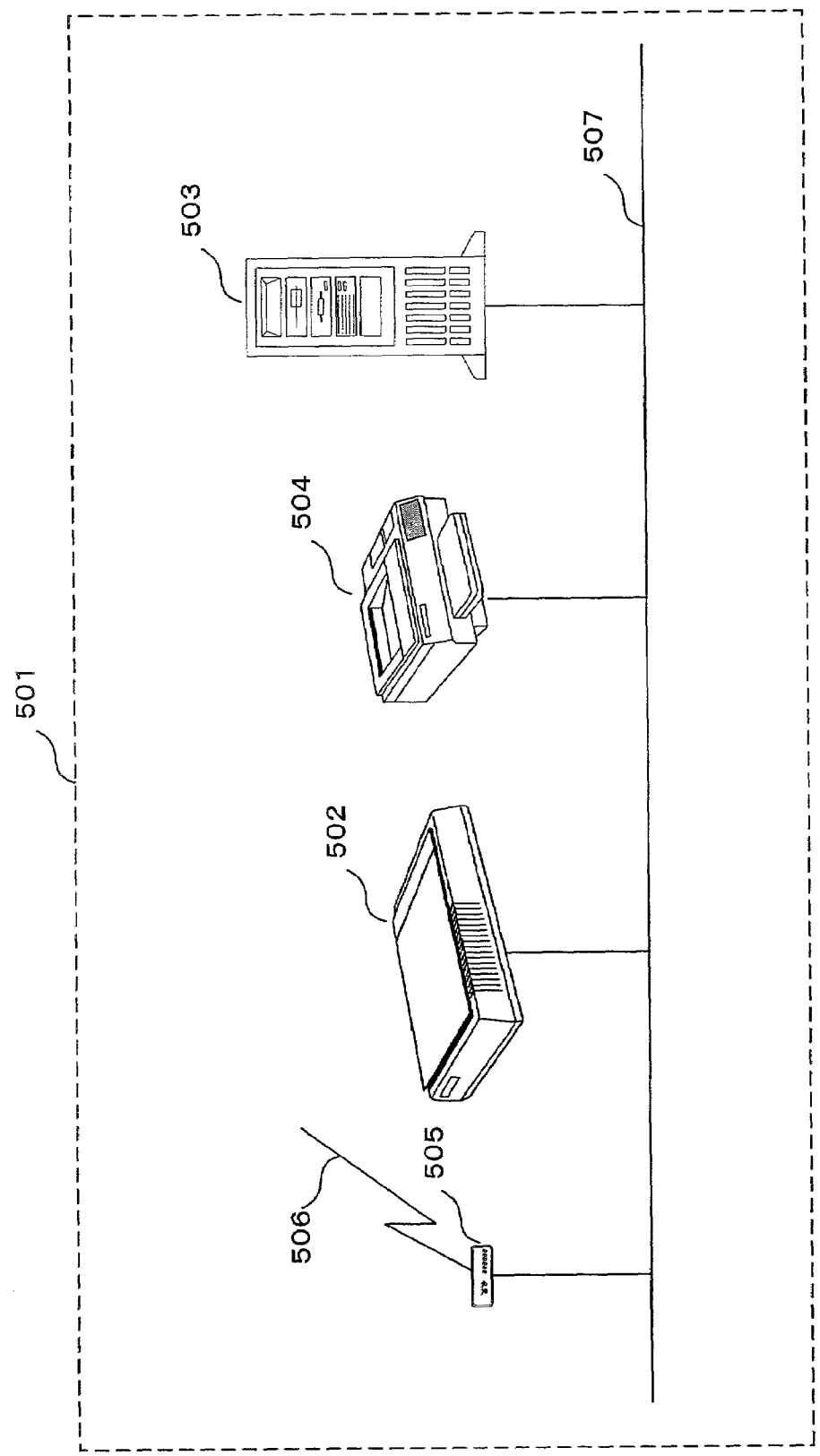
FIG. 5 shows a distributed processing system using a business machine network.

With reference to FIGS. 2 and 4, the structures of business machine network terminals according to Embodiment 2 of the present invention will be described below. FIG. 4 is a processing flowchart for a business machine network system according to Embodiment 2. Because Embodiments 1 and 2 have many points (or aspects) in common, only the points of Embodiment 2 that differ from Embodiment 1 will be described. With reference to FIG. 4, a scanner 401, an image processing server 402 and a printer 403 correspond to the business machine network terminals 101a, 101b and 101c, respectively, shown in FIG. 2. In distinction from FIG. 3, the same steps in FIGS. 3 and 4 are assigned the same numerals, while the corresponding steps in them are assigned numerals with the same last two digits. In FIG. 4, "S" preceding a numeral represents a step.

A user wanting to use a copy service may insert his or her ID card into the scanner 401 and input his or her password (S301 in FIG. 4). The processing that starts with this step S301, includes the authentication of the user and the selection of a service, and ends with the scanning on the scanner 401 (S306 in FIG. 4) is similar to that of Embodiment 1.

After the scanning, on the basis of the processing sequence information stored in the processing information storing means 106 of the scanner 401, the processing information managing means 105 of this scanner transmits to the image processing server 402 the user handle, the processing sequence information and the commands for the business machine network terminals that are stored in this storing means 106, and the image data generated by the scanning (S407 in FIG. 4). The transmitted handle, information, commands and data are similar to the multiplex processing request packet 1101 shown in FIG. 11A. Unlike Embodiment 1, however, this managing means 105 does not transmit the user handle, the device ID and the service information to the information management server 201.

Receiving the user handle, the processing sequence information and the generated image data, the processing information managing means 105 of the image processing server 402 stores the user handle and the sequence information in the processing information storing means 106. In the meantime, the processing means 102 of this server 402 processes the received image data on the basis of a command (for example, the "4 in 1" processing) stored in the multiplex processing request packet 1101 (S411 in FIG. 4).

Next, this processing information managing means 105 transmits the stored user handle and sequence information and the processed image data to the printer 403 (S412 in FIG. 4). The transmitted handle, information and data are similar to the multiplex processing request packet 1108 shown in FIG. 11B.

Further, the processing information managing means 105 of the image processing server 402 transmits the user handle, the device ID (the unique ID assigned to this server 402), and service information to the scanner 401 (S413 in FIG. 4). The transmitted handle, ID and information are similar to the image processor use information 1205 of Embodiment 1. The service information is similar to that of Embodiment 1.

Thus, Embodiment 2 differs from Embodiment 1 also in that the image processing server 402 transmits the user handle, the device ID and the service information to the scanner 401.

Receiving the user handle, the device ID and the service information, the processing information managing means 105 of the scanner 401 stores them in the processing information storing means 106 of this scanner.

Subsequently, receiving the user handle, the processing sequence information and the converted image data, the processing information managing means 105 of the printer 403 stores the user handle and the sequence information in its processing information storing means 106. In the meantime, the processing means 102 of the printer 403 prints the image data (S416 in FIG. 4). Next, this managing means 105 transmits the user handle, the device ID (the unique ID assigned to the printer 403), and service information to the processing information managing means 105 of the scanner 401 (S416 in FIG. 4). The transmitted handle, ID and information are similar to the printer use information 1209 of Embodiment 1 (but the processing termination information 1213 is not necessarily needed). In this respect as well, Embodiment 2 differs from Embodiment 1. However, the service information is similar to that of Embodiment 1.

Receiving the user handle, the device ID and the service information, the processing information managing means 105 of the scanner 401 stores them in the processing information storing means 106 of this scanner.

The processing mentioned above completes the copy service provided by the business machine network system.

Receiving the user handle, the device ID, the service information and the processing termination information 1213, the processing information managing means 105 of the scanner 401 transmits to the information management server 201 the device IDs of the scanner 401, image processing server 402 and printer 403 and the service information that are stored in the processing information storing means 106 of the scanner 401, together with the user handle acquired when the user was authenticated (S420 in FIG. 4).

Figure 13:
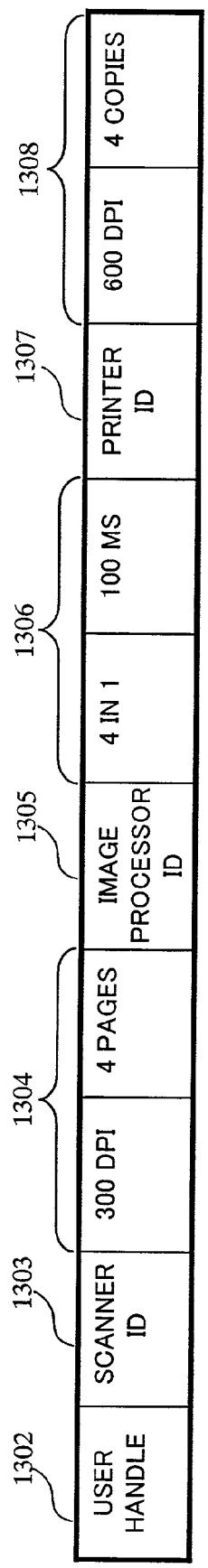
FIG. 13 shows an overall use information structure.

The transmitted device IDs and service information is such overall use information 1301 as is shown in FIG. 13. The use information 1301 consists of a user handle 1302, a scanner ID 1303, service information 1304, an image processor ID 1305, service information 1306, a printer ID 1307 and service information 1308, which are identical with the user handle 1202 (1206, 1210), scanner ID 1203, service information 1204, image processor ID 1207, service information 1208, printer ID 1211 and service information 1212, respectively, of Embodiment 1.

Thus, the scanner 401, image processing server 402 and printer 403, which are the business machine network terminals of Embodiment 2, do not separately transmit to the information management server 201 the pieces of information on the services provided by the terminals. After the pieces of information are accumulated once in the predetermined terminal (scanner 401), they are transmitted together to the information management server 201.

Thus, various types of processing are performed by the business machine network terminal (scanner 401) that the users will expectedly use most frequently. This enables only this particular terminal to have high capabilities, with the other terminals having only minimum control functions. It is consequently possible to reduce the installation cost for the whole system.

Subsequently, the management information calculating means 206 of the information management server 201 stores the received user handle, the received device IDs of the scanner 401, image processing server 402 and printer 403, and the received service information in the management information storing means 205. On the basis of the service information about the business machine network terminals that is stored in this storing means 205 and the user information stored in the user information managing means 204, like Embodiment 1, the information management server 201 may, as the need arises, calculate the use history of each terminal, the amount of money that each service used by the user has cost (accounting information), and the cost for each project (S419 in FIG. 4). The processing with the management information calculating means 206 may be similar to that in Embodiment 1, except that the processing is performed with information acquired from the overall use information 1301.

By thus causing the information management server 201 to centrally manage the information on the processing performed by the terminals 401–03, it is possible to achieve effect similar to that achieved by Embodiment 1.

Embodiment 2 could, like Embodiment 1, provide a facsimile service by replacing the printer 403 with a facsimile modem and adding a telephone charge (calling time information or the like) to the service information that the modem transmits to the scanner 401.

The processing in Embodiment 2 as well includes authenticating a user, but the authentication is not essential like Embodiment 1. Like Embodiment 1, the service information might be only the amount of money that the processing with each business machine network terminal has cost according to need. Each terminal might have a function for calculating this amount of money. This makes it possible to acquire only the accounting information on a provided service.

The scanner 401 transmits the overall use information to the information management server 201. Alternatively, pieces of use information might be transmitted to the printer 403 as the terminal for the final processing, and the printer might transmit overall use information to the management server 201.

What is claimed is:

1. A business machine network terminal for providing services by transmitting and receiving data to/from other business machine network terminals each including a different function through a network and performing cooperative processing with the other business machine network terminals, the business machine network terminal comprising:

service selecting means for selecting one of the services;

processing means for performing processing necessary for the selected service; and processing information transmitting means for transmitting to an object terminal service information that is generated on the basis of the processing with the processing means, and that is necessary for managing business machine network terminals on the network, wherein the service selecting means obtains information of the other business machine network terminals connected to the network, and decides available services to be provided by the cooperative processing with other business machine network terminals, each of which is available to perform its function at the time of the selection of the service selecting means, on the basis of a list of types of business machine network terminals necessary for the services and the information of the other business machine network terminals, and selectably displays the available services, and the business machine network terminal decides processing sequence of the cooperative processing with other business machine network terminals for providing the service, when a specific service is selected by using the service selecting means, on the basis of available service information which associated with types of business machine network terminals necessary for the services and processing sequence of each business machine network terminal for the service.

2. The business machine network terminal defined in claim 1, further comprising:

processing information managing means for confirming the operation statuses of the other business machine network terminals necessary for providing the selected service and judging whether each function of those other business machine network terminals can be provided normally based on the operation status, when the service is selected, wherein the processing information managing means transmits a multiplex processing request packet to each selected business machine network terminal based on processing sequence information, the multiplex processing request packet including the processing sequence information having a processing sequence for one or more business machine network terminals for providing a series of services, commands for processing means of the other business machine network terminals, user handle for identifying a user, and data which is an object of processing, and the processing information managing means, when the multiplex processing request packet from the other business machine network terminals is received, requests processing of the command included in the multiplex processing request packet to the processing means.

3. A business machine network terminal providing services by transmitting and receiving data to/from other business machine network terminals including a different function through a network and performing cooperative processing with the other business machine network terminals, the business machine network terminal comprising:

service selecting means for selecting one of the services;

processing means for performing processing necessary for the selected service; and processing information transmitting means for transmitting to an object terminal service information that is generated on the basis of the processing with the processing means, and that is necessary for managing business machine network terminals on the network, wherein the service selecting means, in case where there are a plurality of other business machine network terminals which can provide the same function, selectably displays those business machine network terminals, or selects one or more of those business machine network terminals on the basis of information about the performance or installed place of those business machine network terminals, and wherein the business machine network terminal decides processing sequence of the cooperative processing with other business machine network terminals for providing the service, when a specific service is selected by using the service selecting means, on the basis of available service information which associated with types of business machine network terminals necessary for the services and processing sequence of each business machine network terminal for the service.

4. The business machine network terminal defined in claim 3, further comprising:

processing information managing means for confirming the operation statuses of each selected business machine network terminal and judging whether the function of each selected business machine network terminal can be provided normally based on the operation status, when each business machine network terminal is selected, wherein the processing information managing means transmits a multiplex processing request packet to each selected business machine network terminal based on processing sequence information, the multiplex processing request packet including the processing sequence information having a processing sequence for one or more business machine network terminals for providing a series of services, commands for processing means of the other business machine network terminals, user handle for identifying a user, and data which is an object of processing, and the processing information managing means, when the multiplex processing request packet from the other business machine network terminals is received, requests processing of the command included in the multiplex processing request packet to the processing means.

5. A business machine network information management system for providing services by transmitting and receiving data between business machine network terminals through a network, and by performing cooperative processing with the business machine network terminals, the business machine network terminals each having a function different from the functions of the other business machine network terminals, wherein each of the business machine network terminals includes:

service selecting means for selecting one of the services;

processing means for performing processing necessary for the selected service; and processing information transmitting means for transmitting to an information management server service information that is generated on the basis of the processing with the processing means, and that is necessary for managing business machine network terminals on the network, and the information management server includes management information calculating means for calculating management information on the basis of the service information received from the business machine network terminals, wherein the service selecting means obtains information of the other business machine network terminals connected to the network, and decides available services to be provided by the cooperative processing with other business machine network terminals, each of which is available to perform its function at the time of the selection of the service selecting means, on the basis of a list of types of business machine network terminals necessary for the services and the information of the other business machine network terminals connected to the network, and selectably displays the available services, and each business machine network terminal is configured to decide a processing sequence of the cooperative processing with other business machine network terminals for providing the service, when a specific service is selected by using the service selecting means, on the basis of available service information which associated with types of business machine network terminals necessary for the services and processing sequence of each business machine network terminal for the service.

6. A business machine network information management system for providing services by transmitting and receiving data between business machine network terminals through a network, and by performing cooperative processing with the business machine network terminals, the business machine network terminals each having a function different from the functions of the other business machine network terminals, wherein each of the business machine network terminals includes:
service selecting means for selecting one of the services;
processing means for performing processing necessary for the selected service; and
processing information transmitting means for transmitting to an information management server service information that is generated on the basis of the processing with the processing means, and that is necessary for managing business machine network terminals on the network, and the information management server includes management information calculating means for calculating management information on the basis of the service information received from the business machine network terminals, wherein the service selecting means of each business machine network terminal, in case where there are a plurality of other business machine network terminals which can provide same function, selectably displays those business machine network terminals, or selects one or more of those business machine network terminals on the basis of information about the performance or installed place of those business machine network terminals, and each business machine network terminal is configured to decide a processing sequence of the cooperative processing with other business machine network terminals for providing the service, when a specific service is selected by using the service selecting means, on the basis of available service information which associated with types of business machine network terminals necessary for the services and processing sequence of each business machine network terminal for the service.

7. The business machine network information management system defined in claim 5 or 6, wherein the processing information transmitting means of each business machine network terminal corresponding to the selected service transmits a device ID which can specify itself and the service information to a specific business machine network terminal when processing of the processing means of that business machine network terminal is completed, the specific business machine network terminal transmits the device ID and the service information transmitted from other business machine network terminals, to the information management server after completing all processings of the business machine network terminals corresponding to the selected service, the management information calculating means of the information management server calculates a charge of the selected service on the basis of the device ID and the service information received from the business machine network terminals.

* * * * *